(12) United States Patent
Berke et al.

(10) Patent No.: US 8,307,632 B2
(45) Date of Patent: Nov. 13, 2012

(54) POST INJECTION BUCKETING STRATEGY TO AVOID HARDWARE CAVITATION

(75) Inventors: Paul L. Berke, Chicago, IL (US);
Felicia Centeno, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 546 days.

(21) Appl. No.: 12/546,733

(22) Filed: Aug. 25, 2009

(65) Prior Publication Data

US 2011/0047969 A1 Mar. 3, 2011

(51) Int. Cl.
*F01N 3/00* (2006.01)

(52) U.S. Cl. ........... 60/285; 60/274; 60/286; 60/295; 60/297

(58) Field of Classification Search ........... 60/274, 60/285, 295, 286
See application file for complete search history.

(56) References Cited

U.S. PATENT DOCUMENTS

| | | | |
|---|---|---|---|
| 6,286,486 B1* | 9/2001 | Robinson et al. | 123/457 |
| 6,898,508 B2* | 5/2005 | Nakano et al. | 701/103 |
| 2003/0221423 A1* | 12/2003 | Kosaka et al. | 60/297 |
| 2004/0139738 A1* | 7/2004 | Kuboshima et al. | 60/288 |
| 2004/0194756 A1* | 10/2004 | Hotta et al. | 123/299 |
| 2005/0241301 A1* | 11/2005 | Okugawa et al. | 60/295 |
| 2007/0012031 A1* | 1/2007 | Tanimura et al. | 60/285 |
| 2009/0056817 A1* | 3/2009 | Almaraz et al. | 137/505 |

OTHER PUBLICATIONS

F.Payri, V.Bermudez, R. Payri*, F.J. Salvador; The influence of cavitation on the internal flow and the spray characterstics in diesel injection nozzles; CMT-motores termincos, Universidad Politecnica de Valencia, Camino de Vera; E-46022 Spain; pp. 419-431.*

* cited by examiner

*Primary Examiner* — Binh Q Tran
*Assistant Examiner* — Anthony Ayala Delgado
(74) *Attorney, Agent, or Firm* — Jeffrey P. Calfa; Mark C. Bach

(57) ABSTRACT

An engine control system (18) causes fuel to be post-injected into combustion chambers by a "buffering" or "bucketing" strategy (instructions 100-111 in FIG. 3) to mitigate fuel system cavitation during regeneration of a diesel particulate filter (24).

16 Claims, 2 Drawing Sheets

```
100    if LV_REQ_RGN_PF == 1
101       if (MF_POST2_REQ < MF_MIN)&&(N_COND==1)
102          MF_BUF1 = MF_POST2_REQ + MF_BUF;

103          if MF_BUF1 >= MF_MIN
104             MF_POST2 = MF_MIN + OTHER;

105             MF_BUF1 = MF_BUF - MF_POST2;

106             if MF_BUF1 < 0
107                MF_BUF1 = 0;
108             end 109          else
110             MF_POST2 = 0;
111          end 112       else
113          MF_POST2 = MF_POST2_REQ;

114          MF_BUF1 = MF_BUF;
115       end
116    else
117       MF_POST2 = 0;
118       MF_BUF1 = 0;
119    end
```

Post-Injection Fueling

```
100    if LV_REQ_RGN_PF == 1
101        if (MF_POST2_REQ < MF_MIN)&&(N_COND==1)
102            MF_BUF1 = MF_POST2_REQ + MF_BUF;

103            if MF_BUF1 >= MF_MIN
104                MF_POST2 = MF_MIN + OTHER;

105                MF_BUF1 = MF_BUF - MF_POST2;

106                if MF_BUF1 < 0
107                    MF_BUF1 = 0;
108                end 109            else
110                MF_POST2 = 0;
111            end 112        else
113            MF_POST2 = MF_POST2_REQ;

114            MF_BUF1 = MF_BUF;
115        end
116    else
117        MF_POST2 = 0;
118        MF_BUF1 = 0;
119    end
```

Figure 3

POST INJECTION BUCKETING STRATEGY TO AVOID HARDWARE CAVITATION

FIELD OF THE INVENTION

This invention relates generally to internal combustion engines for propelling motor vehicles, particularly to diesel engines having after-treatment devices in their exhaust systems, especially diesel particulate filters (DPF's).

BACKGROUND OF THE INVENTION

Known systems for treating exhaust gases passing through an exhaust system of a diesel engine include a diesel particulate filter (DPF) that traps diesel particulate matter (DPM).

A DPF requires regeneration from time to time in order to maintain particulate trapping efficiency. Regeneration involves creating conditions that will burn off trapped particulates whose unchecked accumulation would otherwise impair DPF effectiveness.

The creation of conditions for initiating and continuing regeneration generally involves elevating the temperature of exhaust gas entering the DPF to a suitably high temperature. Because a diesel engine typically runs relatively cool and lean, the post-injection of diesel fuel has been used as part of a DPF regeneration strategy to elevate exhaust gas temperatures entering the DPF while still leaving excess oxygen for burning the trapped particulate matter.

When a vehicle is being operated in a way conducive to DPF regeneration, such as cruising on a highway, the regeneration process may be conducted with little or no significant effect on vehicle driveability and may be initiated either by the driver or else automatically by a regeneration initiation strategy even before the DPF becomes loaded with DPM to an extent where forced regeneration would be mandated by the engine control system. Regeneration can even be initiated while a vehicle is parked, provided that engine operating conditions and the immediate surroundings are appropriate for regeneration.

The inventors have observed occurrences of fuel system cavitation during certain regeneration events. Cavitation is typically undesired in hydraulic systems, such as an engine's fuel injection system, because it can eventually lead to damage and ultimately component and/or system failures. Cavitation can also contribute to an engine manufacturer's warranty costs.

Their observance of occasional fuel system cavitation during DPF regeneration has led the inventors to seek a solution for mitigating, and ideally eliminating, such cavitation.

SUMMARY OF THE INVENTION

The present invention relates to a novel strategy that provides such a solution.

The invention can be implemented in existing systems through appropriate processor algorithms in engine control systems that control timing and quantity of main and post-injections of diesel fuel. Hence, no additional hardware is needed for implementing the invention.

Cavitation has been observed when the requested quantity of post-injection fuel for DPF regeneration is below some threshold quantity. That threshold quantity is sometimes greater than the quantity requested by algorithmic calculation of the quantity currently needed for controlled DPF regeneration. In other words, the threshold quantity defines an upper limit of a range of post-injected fuel quantities any of which might cause cavitation if actually injected.

Briefly, the solution provided by the inventors uses a buffer that accumulates successive algorithmically calculated quantities. Only when the quantity in the buffer equals or exceeds the threshold quantity does post-injection into an engine cylinder occur.

A further aspect of the solution relates to how the amount of fuel actually post-injected is calculated.

When the quantity in the buffer equals or exceeds the threshold quantity, the actual quantity of fuel post-injected is calculated by adding a marginal quantity to the threshold quantity. The marginal quantity is preferably calibrated by an engine calibrator for the purpose of providing an additional engineering margin beyond the threshold quantity that bounds the suspected cavitation range. The added marginal quantity may also serve the purpose of maintaining DPF regeneration event efficiency and/or length when compared to regeneration performance that doesn't use this "buffering" or "bucketing" strategy.

After a post-injection, the quantity actually post-injected is subtracted from the quantity in the buffer that caused the post-injection to occur. If the difference is a negative quantity, the quantity in the buffer is set to zero. If the difference is a positive non-zero quantity, it is allowed to remain in the buffer.

Engine speed may also be used as a factor to determine if the "buffering" or "bucketing" strategy is appropriate for use. Because cavitation is more likely to occur at higher engine speeds, the strategy may be used to override algorithmically calculated quantities currently needed for controlled DPF regeneration only if engine speed exceeds some threshold value.

Accordingly, one generic aspect of the present invention relates to a diesel engine comprising a fueling system for injecting diesel fuel into combustion chambers where the fuel combusts to power the engine, an exhaust system through which gases created by combustion pass to atmosphere and which comprises an after-treatment device that treats the gases before leaving the exhaust system but at times requires regeneration by elevation of temperature of the gases to a regeneration temperature range, and an engine control system for processing various data to control various aspects of engine operation including fueling performed by the fueling system and regeneration of the after-treatment device.

During regeneration of the after-treatment device, the control system a) calculates a quantity of post-injection fuel that by itself is sufficient to sustain regeneration but may be less than a threshold quantity that the control system uses to demarcate between causing and not causing a post-injection, b) then increments whatever quantity is currently stored in a buffer by the calculated quantity, c) then compares the incremented quantity in the buffer to the threshold quantity, and d) if the quantity in the buffer is at least equal to the threshold quantity, then causes the fueling system to post-inject into one or more of the combustion chambers during a respective engine cycle for the respective combustion chamber a quantity of fuel at least equal to the threshold quantity, but not if the quantity in the buffer is not at least equal to the threshold quantity.

Another generic aspect relates to a method for post-injection fueling of a diesel engine during regeneration of an after-treatment device that treats engine exhaust gases passing through an exhaust system.

The method comprises: a) calculating a quantity of post-injection fuel that by itself is sufficient to sustain regeneration but may be less than a threshold quantity that demarcates between causing and not causing a post-injection, b) incrementing whatever quantity is currently stored in a buffer by the calculated quantity, c) then comparing the incremented quantity in the buffer to the threshold quantity, and d) if the quantity in the buffer is at least equal to the threshold quantity, then causing the fueling system to post-inject into one or more combustion chambers of the engine during a respective engine cycle for the respective combustion chamber a quantity of fuel at least equal to the threshold quantity, but not if the quantity in the buffer is not at least equal to the threshold quantity.

Still another generic aspect relates to a method for mitigating fuel injection system cavitation during post-injection fueling of a diesel engine to regenerate a diesel particulate filter that has trapped diesel particulate matter in engine exhaust gases that has passed through an exhaust system.

The method comprises: a) calculating a quantity of post-injection fuel that by itself is sufficient to sustain regeneration but may be less than a threshold quantity that demarcates smaller injection quantities that are more likely to cause fuel injection system cavitation from larger injection quantities that are less likely to cause fuel injection system cavitation, b) incrementing whatever quantity is currently stored in a buffer by the calculated quantity, c) then comparing the incremented quantity in the buffer to the threshold quantity, and d) if the quantity in the buffer is at least equal to the threshold quantity, then causing the fueling system to post-inject into one or more combustion chambers of the engine during a respective engine cycle for the respective combustion chamber a quantity of fuel at least equal to the threshold quantity, but not if the quantity in the buffer is not at least equal to the threshold quantity.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 3 is a sequence of computer instructions for executing an algorithm that is implemented in a control system for the engine in accordance with principles of the invention.

DESCRIPTION OF THE PREFERRED EMBODIMENT

Figure 1:
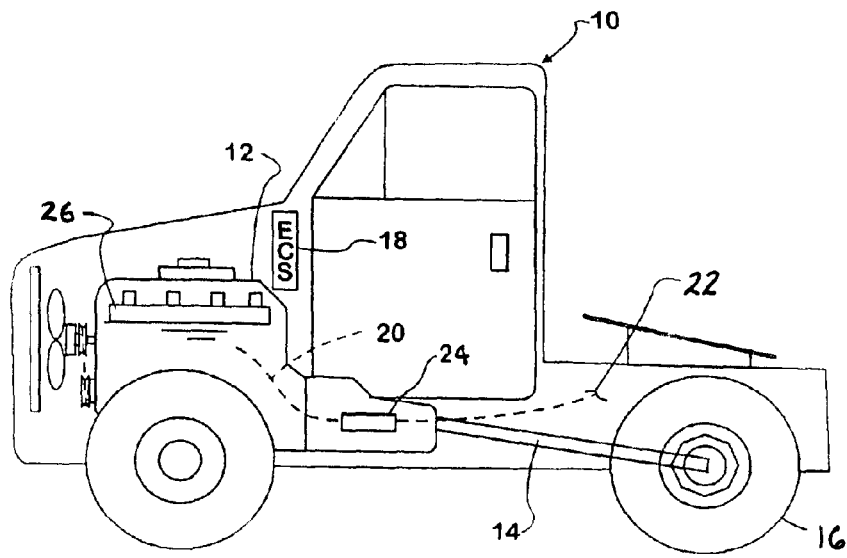
FIG. 1 shows portions of an engine and exhaust system relevant to the present invention in an exemplary use in a motor vehicle.

FIG. 1 shows a truck 10 that is propelled by a diesel engine 12 that is coupled by a drivetrain 14 to driven wheels 16. An engine control system (ECS) 18 has one or more processors processing data from various sources to develop various data that is used for informational and/or control purposes. The data that is processed may originate at external sources, such as sensors, and/or be generated internally.

Engine 12 also has an exhaust system 20 through which exhaust created by combustion of a combustible mixture in combustion chambers of engine 12 is conveyed to a tail pipe 22 that opens to the surrounding atmosphere. Exhaust system 20 comprises one or more after-treatment devices, one of which is a diesel particulate filter (DPF) 24 that traps diesel particulate matter (DPM) so that such matter does not pass through tail pipe 22 and into the surrounding atmosphere.

The combustion chambers of engine 12 comprise cylinders into which fuel is injected by fuel injectors of a fueling system 26 to combust with charge air that has entered through an intake system. Energy released by combustion powers the engine via pistons connected to a crankshaft leading to drivetrain 14 for propelling the vehicle.

The fuel injectors are under the control of ECS 18, typically through injector drivers, to force fuel out of the injector tips into the combustion chambers. Intake valves control the admission of charge air into the cylinders, and exhaust valves control the outflow of combustion gases through exhaust system 20 and ultimately to atmosphere.

As explained earlier, DPF 24 must be regenerated from time to time in order to burn off trapped DPM. When a need for regeneration is determined by a frequently executed algorithm in ECS 18 disclosing that the particulate load in DPF 24 has reached a point where regeneration is required, a regeneration request is issued. If conditions are suitable for initiating regeneration, ECS 18 may then automatically initiate regeneration, such as by changing fueling and/or air management, to suitably condition the exhaust so that it becomes effective to burn off the trapped DPM.

With engine 12 running, a main fuel injection occurs substantially at TDC of an engine cycle for a respective cylinder between the compression stroke and the ensuing expansion, or power, stroke.

When ECS 18 requests regeneration of DPF 24, the main injections continue, while a post-injection strategy is also employed later in the expansion stroke and/or in the ensuing exhaust stroke to elevate exhaust gas temperature sufficiently to burn off DPM. The strategy initiates and sustains regeneration until terminated, at which time post-injection ceases.

ECS 18 executes an algorithm for calculating a quantity of post-injected fuel currently needed for controlled DPF regeneration without consideration for possible fuel system cavitation. During each engine cycle for one or more of the cylinders, that amount is further processed. When the inventive "buffering" or "bucketing" strategy is not being used, such as when engine speed is within a lower speed range where cavitation is not expected to occur, ECS 18 causes that calculated quantity of fuel to be post-injected. When the inventive "buffering" or "bucketing" strategy is being used, that calculated quantity is added to the quantity in the buffer, and the new quantity in the buffer is used to determine if post-injection should or should not occur during this engine cycle.

Figure 2:
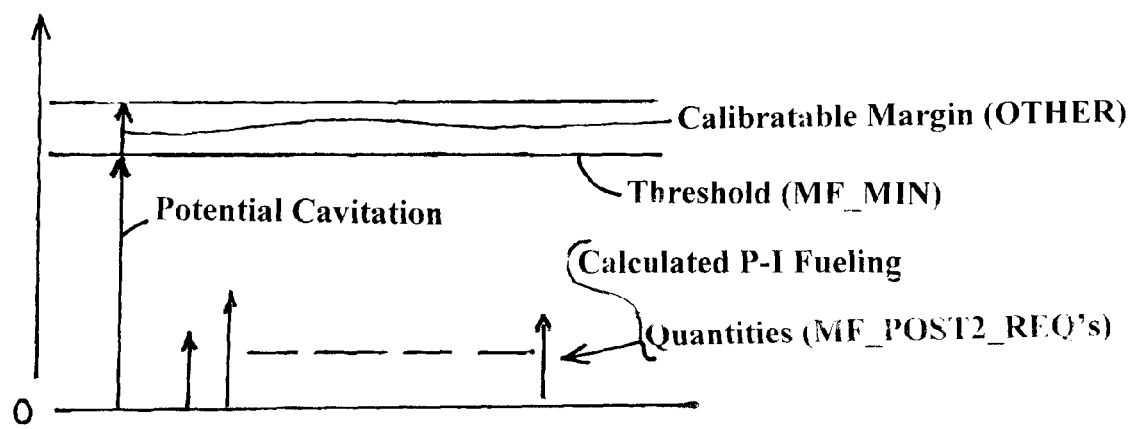
FIG. 2 is a diagram useful in understanding certain aspects of the invention.

The inventive strategy can be more fully explained and understood with the aid of FIG. 2 in which the vertical axis represents quantity of post-injection fueling. The arrow marked "Potential Cavitation" represents a range of post-injection fuel quantities that if post-injected into a cylinder or cylinders may be insufficient to avoid cavitation. The "Threshold", so marked, is the threshold quantity that demarcates between causing and not causing a post-injection. The "Calibratable Margin", so marked, is the quantity that is added to the threshold quantity "Threshold" to set the quantity of fuel to be actually post-injected when the inventive strategy calls for a post-injection. The shorter arrows marked "Calculated P-I Fueling Quantities" are representative of various quantities that are calculated by the algorithm for calculating a quantity of post-injected fuel currently needed for controlled DPF regeneration without consideration for possible cavitation, and while the particular ones shown are less than the threshold quantity, it is possible that some Calculated P-I Fueling Quantities could exceed the "Threshold".

The sequence of computer instructions for the "buffering" or "bucketing" strategy are shown in FIG. 3. LV_REQ_RGN_PF is a parameter that has a value "1" when regeneration is being requested. Hence, when the strategy is in effect, the initial instruction 100 allows following instructions to execute if regeneration is being requested.

In the instructions, MF_MIN is a parameter representing the quantity marked "Threshold" in FIG. 2. MF_POST2_REQ is a parameter representing the quantity calculated by the algorithm that calculates a quantity of post-injected fuel currently needed for controlled DPF regeneration without consideration for possible cavitation. N_COND is a parameter that indicates whether engine speed is sufficiently high that the strategy should continue to execute. MF_BUF is a parameter representing the quantity in the buffer. OTHER is a parameter representing the quantity of fuel corresponding to the "Calibratable Margin" marked in FIG. 2.

Instruction 101 compares the calculated quantity of post-injected fuel currently needed for controlled DPF regeneration (MF_POST2_REQ) without consideration for possible cavitation to "Threshold" (MF_MIN), and also determines if engine speed is sufficiently high that the strategy should continue to execute because cavitation is more likely at higher engine speeds.

A sufficiently high speed is indicated by N_COND==1. If speed is sufficiently high and the calculated quantity of post-injected fuel currently needed for controlled DPF regeneration is less than "Threshold", then instruction 102 adds the calculated quantity of post-injected fuel currently needed for controlled DPF regeneration without consideration for possible cavitation to whatever quantity is in the buffer. The new quantity in the buffer is represented by MF_BUF1.

Instruction 103 compares the new quantity in the buffer to "Threshold", and if the former is greater than or equal to the latter, then instruction 104 causes post-injection of fuel in a quantity equal to the sum of "Threshold" and the calibratable margin OTHER.

Instruction 105 then causes the quantity of fuel actually post-injected (MF_POST2) to be subtracted from the quantity in the buffer so that the quantity in the buffer becomes MF_BUF1. If the difference is negative, then instructions 106, 107 set the quantity in the buffer to zero, and instruction 108 ends this iteration of the strategy.

If instruction 103 had disclosed that the new quantity in the buffer was not greater than or equal to "Threshold", then instructions 104-107 would have been bypassed, and steps 109, 110 would have resulted in the quantity of fuel to be post-injected being set to zero, meaning that no post-injection would have occurred and the iteration of the strategy would have been ended by instruction 111.

If instruction 101 had resulted in engine speed not being sufficiently high (i.e., $N_{13}COND=0$), then the "buffering" or "bucketing" strategy would have been bypassed, with instructions 112, 113 causing the actual quantity of fuel post-injected (MF_POST2) to be the quantity corresponding to the calculated quantity of post-injected fuel currently needed for controlled DPF regeneration, a quantity that for lower engine speeds would be expected not to cause cavitation. Instruction 114 keeps whatever quantity is in the buffer unchanged before instruction 115 ends the iteration.

If instruction 100 had disclosed that regeneration was not be requested, then instructions 101-115 would have been bypassed with instructions 116, 117, and 118 resulting in no fuel being post-injected (MF_POST2=0) and the quantity in the buffer (MF_BUF1) being set to zero before instruction 119 ends the iteration.

It can be appreciated that when the "buffering" or "bucketing" strategy is active, one or more engine cycles may occur before the quantity in the buffer reaches the threshold to trigger an actual post-injection.

The value for parameter MF_MIN ("Threshold") is not necessarily a constant, but rather may vary to some extent with engine speed and load. The fuel injectors for a particular engine may control injection quantity properly only when the width of an applied pulse width modulated signal is at least a certain minimum, 600 to 800 microseconds being typical depending on the particular injector. For a particular injector, that minimum pulse width requirement may depend to some extent on speed/pressure/command conditions.

At the higher speeds and loads, the minimum post-injection fuel quantity that can be injected because of the minimum pulse width requirement for an injector can become too large for exhaust conditions that do not need such large quantities of fuel because they would lead to overtemperatures. The disclosed "bucketing" strategy that accomplishes desired control also inherently takes the minimum pulse width requirement of the injector into account, preventing it from being a potential issue in accomplishing regeneration under the conditions where the "bucketing" strategy is active.

Certain diesel engines are at times capable of operating by alternative diesel combustion, as distinguished from CD (conventional diesel) combustion, and while the engine that has been described here operates by CD combustion, it is believed that principles of the invention are applicable to an engine running by alternative diesel combustion provided that the control system allows DPF regeneration while the engine is so running. Alternative diesel combustion is a generic term for certain processes and systems such as Homogeneous Charge Compression Ignition (HCCI), Controlled Auto-Ignition (CAI), Dilution Controlled Combustion Systems (DCCS), and Highly Premixed Combustion Systems (HPCS). When an engine is running by an alternative diesel combustion process, the effect of whatever injections occur until main combustion occurs may be considered equivalent to a main injection of CD combustion.

While a presently preferred embodiment of the invention has been illustrated and described, it should be appreciated that principles of the invention apply to all embodiments falling within the scope of the following claims.

What is claimed is:

1. A diesel engine comprising: a fueling system for injecting diesel fuel into combustion chambers where the fuel combusts to power the engine; an exhaust system through which gases created by combustion in the combustion chambers pass to atmosphere and which comprises an after-treatment device that treats the gases before leaving the exhaust system but at times requires regeneration by elevation of temperature of the gases to a regeneration temperature range;

an engine control system for processing various data to control various aspects of engine operation including fueling performed by the fueling system and regeneration of the after-treatment device; the engine control system configured to execute instructions, during regeneration of the after-treatment device, said instruction comprising:
  a) determining a calculated quantity of post-injection fuel that by itself is sufficient to sustain regeneration but less than a threshold quantity that the engine control system uses to demarcate between causing and not causing a post-injection of fuel;
  b) incrementing a quantity of post-injected fuel that is currently stored in a buffer by the calculated quantity to yield an incremented quantity in the buffer;
  c) comparing the incremented quantity in the buffer to the threshold quantity; and d) if the incremented quantity in the buffer is at least equal to the threshold quantity, then causes the fueling system to post-inject into one or more of the combustion chambers, during a respective engine cycle for a respective combustion chamber, a quantity of fuel at least equal to the threshold quantity, but if the incremented quantity in the buffer is not at least equal to the threshold quantity causes the fuel system not to post-inject.

2. The diesel engine as set forth in claim 1 wherein if the incremented quantity in the buffer is at least equal to the threshold quantity, the engine control system executes a step that calculates a modified injection quantity that is greater than the threshold quantity and causes the fueling system to post-inject into one or more of the combustion chambers during a respective engine cycle for the respective combustion chamber a quantity of fuel equal to the modified injection quantity.

3. The diesel engine as set forth in claim 2 wherein the engine control system calculates the modified injection quantity by an addition step that adds a quantity to the threshold quantity.

4. The diesel engine as set forth in claim 3 wherein before an engine cycle that succeeds one during which a modified injection quantity was post-injected, the engine control system subtracts the modified injection quantity from the current quantity in the buffer to leave a difference quantity in the buffer and then increments the difference quantity in the buffer by the calculated quantity.

5. The diesel engine as set forth in claim 1 wherein during regeneration of the after-treatment device, the control system increments a quantity currently stored in the buffer by the calculated quantity only if engine speed is higher than a threshold engine speed.

6. The diesel engine as set forth in claim 1 wherein the after-treatment device comprises a diesel particulate filter.

7. A method for post-injection fueling by a fuel system into one or more combustion chambers of a diesel engine, during a regeneration of an after-treatment device that treats engine exhaust gases passing through an exhaust system, the method comprising:
   a) determining a calculated quantity of post-injection fuel that by itself is sufficient to sustain regeneration but less than a threshold quantity to demarcate between causing and not causing a post-injection of fuel;
   b) incrementing a quantity of post-injected fuel that is currently stored in a buffer by the calculated quantity to yield an incremented quantity in the buffer;
   c) comparing the incremented quantity in the buffer to the threshold quantity; and
   d) if the incremented quantity in the buffer is at least equal to the threshold quantity, then causes the fueling system to post-inject into one or more of the combustion chambers, during a respective engine cycle for a respective combustion chamber, a quantity of fuel at least equal to the threshold quantity, but if the incremented quantity in the buffer is not at least equal to the threshold quantity causes the fuel system not to post-inject.

8. The method as set forth in claim 7 comprising calculating a modified injection quantity that is greater than the threshold quantity and causing the fueling system to post-inject into one or more of the combustion chambers during a respective engine cycle for the respective combustion chamber a quantity of fuel equal to the modified injection quantity if the incremented quantity in the buffer is at least equal to the threshold quantity.

9. The method as set forth in claim 8 comprising calculating the modified injection quantity by an addition step that adds a quantity to the threshold quantity.

10. The method as set forth in claim 9 wherein before an engine cycle that succeeds one during which a modified quantity of fuel was post-injected, subtracting the modified injection quantity from the current quantity in the buffer to leave a difference quantity in the buffer and then incrementing the difference quantity in the buffer by the calculated quantity.

11. The method as set forth in claim 7 comprising incrementing a quantity currently stored in the buffer by the calculated quantity only if engine speed is higher than a threshold engine speed.

12. A method for mitigating fuel injection system cavitation during post-injection fueling by a fuel system into one or more combustion chambers of a diesel engine to regenerate a diesel particulate filter that has trapped diesel particulate matter in engine exhaust gases that have gas passed through an exhaust system, the method comprising:
   a) determining a calculated quantity of post-injection fuel that by itself is sufficient to sustain regeneration but less than a threshold quantity that demarcates smaller injection quantities that are more likely to cause fuel injection system cavitation from larger injection quantities that are less likely to cause fuel injection system cavitation;
   b) incrementing a quantity of post-injected fuel that is currently stored in a buffer by the calculated quantity to yield an incremented quantity in the buffer;
   c) comparing the incremented quantity in the buffer to the threshold quantity; and
   d) if the incremented quantity in the buffer is at least equal to the threshold quantity, then causing the fueling system to post-inject into one or more combustion chambers of the engine during a respective engine cycle for a respective combustion chamber, a quantity of fuel at least equal to the threshold quantity, but if the incremented quantity in the buffer is not at least equal to the threshold quantity causes the fuel system not to post-inject.

13. The method as set forth in claim 12 comprising calculating a modified injection quantity that is greater than the threshold quantity and causing the fueling system to post-inject into one or more of the combustion chambers during a respective engine cycle for the respective combustion chamber a quantity of fuel equal to the modified injection quantity if the incremented quantity in the buffer is at least equal to the threshold quantity.

14. The method as set forth in claim 13 comprising calculating the modified injection quantity by an addition step that adds a quantity to the threshold quantity.

15. The method as set forth in claim 14 wherein before an engine cycle that succeeds one during which a modified quantity of fuel was post-injected, subtracting the modified injection quantity from the current quantity in the buffer to leave a difference quantity in the buffer and then incrementing the difference quantity in the buffer by the calculated quantity.

16. The method as set forth in claim 12 comprising incrementing a quantity currently stored in the buffer by the calculated quantity only if engine speed is higher than a threshold engine speed.

* * * * *